C. ASHMUSEN.
CHAIN TONGS.
APPLICATION FILED SEPT. 29, 1921.
1,408,968.
Patented Mar. 7, 1922.
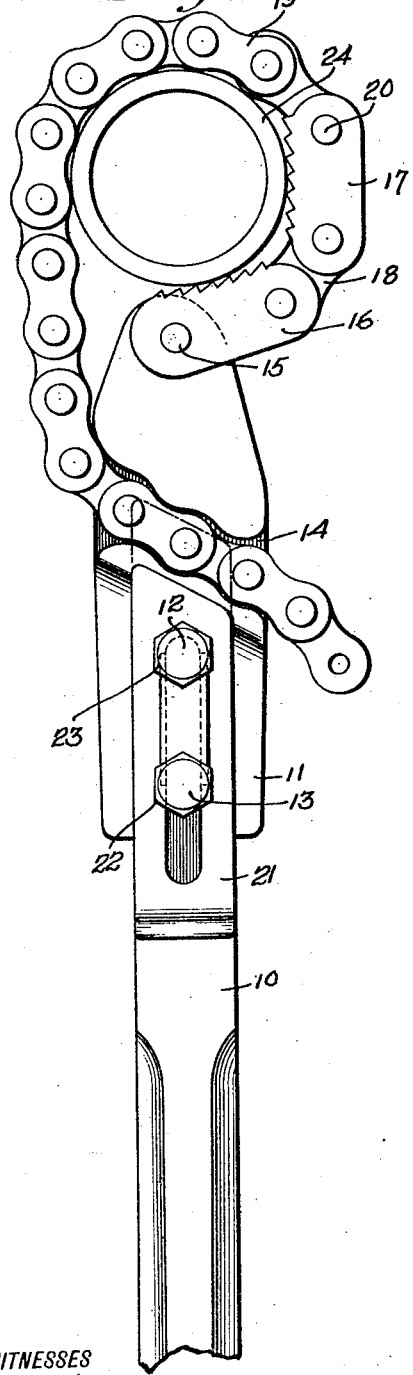
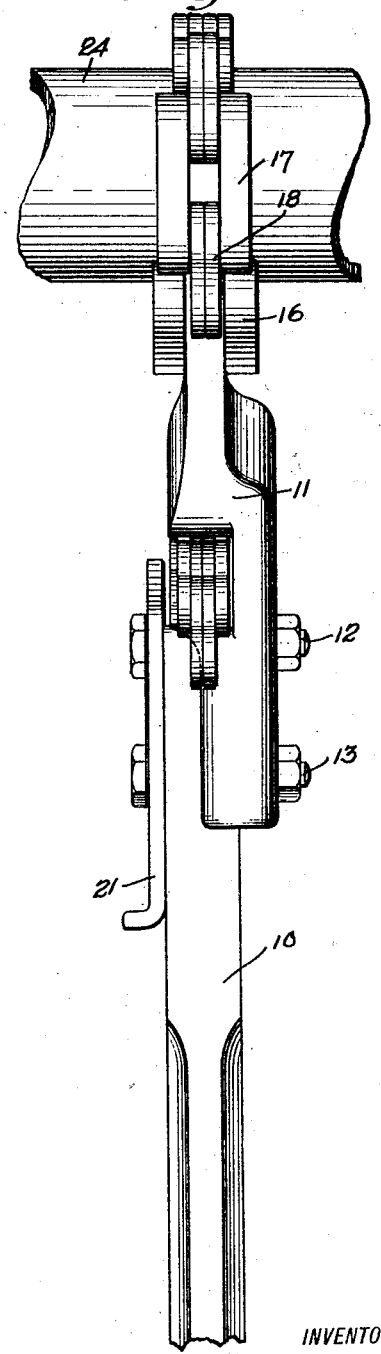
WITNESSES
INVENTOR
CHRISTIAN ASHMUSEN
BY
ATTORNEYS

UNITED STATES PATENT OFFICE.

CHRISTIAN ASHMUSEN, OF ALBANY, NEW YORK.

CHAIN TONGS.

1,408,968.  Specification of Letters Patent.  Patented Mar. 7, 1922.

Application filed September 29, 1921. Serial No. 504,048.

*To all whom it may concern:*

Be it known that I, CHRISTIAN ASHMUSEN, a citizen of the United States, and a resident of Albany, in the county of Albany and State of New York, have invented a new and Improved Chain Tongs, of which the following is a full, clear, and exact description.

This invention relates to chain tongs primarily designed for use with pipes.

Prior to this invention the usual type of chain pipe tongs was constructed with serrated edges on the head of the tongs and a flexible chain cooperating with the head to cause it to grip the same. Pipe tongs constructed thus usually take such a grip of the pipe that they are not easy to remove and they also tend to mutilate the surface of the pipe.

The object of this invention is to provide pipe tongs having gripping means which conform to the shape of the pipe pivoted to the lever arm and supplying in conjunction with the gripping means, means for connecting the free end of the gripping means to the lever arm and means for locking the connecting means in engagement with the lever arm.

This object is accomplished by pivotally connecting one or more gripping links to the lever arm and providing chain means which connect the free end of the gripping links to the lever arm and mounting a slide for locking the chain in engagement with the lever arm.

This and other objects of the invention will be more clearly understood from the following detailed description and accompanying drawings.

Figure 1 is a plan view of the chain tongs showing them connected to a pipe.

Figure 2 is a side view of the chain tongs connected to the pipe.

Referring to the above-mentioned drawings, a handle or lever arm 10 has a head 11 connected thereto by means of bolts 12 and 13. The handle 10 and head 11 may be made of any suitable material and may be connected together by means of bolts or made integral with one another. The head 11 has cut therein a groove 14 which conforms with the shape of the links of the chain used in conjunction therewith. The upper end of the head 11 is round and has pivoted thereto at 15 a gripping link 16, one edge of which is slightly curved and serrated. A second gripping link 17 is pivotally connected to the gripping link 16 by means of the link 18. This link 17 is also slightly curved and has a serrated edge. A chain 19 is pivotally connected to the link 17 at 20.

The groove 14 cut in the head 11 conforms to the shape of the links 19 and serves to engage the chain. A slide 21 is mounted on guides 22 and 23 which are provided in conjunction with the bolts 13 and 12 respectively. This slide may be moved on the guides so as to lock the chain in the groove 14 as shown in Figure 2.

The chain is wrapped around a pipe 24 as shown in Figure 1, and fastened in groove 14. When force is applied to the handle 10 to turn the pipe, the gripping links 16 and 17 are forced into contact with the pipe. On account of the force applied at the point 15, the gripping links 16 and 17 do not tend to slide on the pipe and tear the outer surface. The groove 14 engages the whole link and gives a greater area to withstand the force and, consequently, the links of the chain are not damaged in the way usual when a bar extending through the link is gripped by the jaws of the head of the tongs.

I wish to state in conclusion that while the illustrated example constitutes a practical embodiment of my invention, I do not limit myself strictly to the mechanical details herein illustrated since manifestly the same can be considerably varied without departing from the spirit of the invention as defined in the appended claims.

Claims:

1. A pipe tongs of the class described comprising a handle, a head bolted to the handle, serrated pipe gripping links pivotally connected to the head, a chain pivotally connected to the links, a groove conforming to the shape of the chain links extending across the head for engaging them, and a slide mounted on guides in conjunction with the head bolts for locking the chain in said groove.

2. As a new article of manufacture, a pipe tongs of the class described comprising a handle, a head having a smooth end attached to the handle, pipe gripping means in the form of a chain having one end pivotally connected to the head so that the latter does not engage the pipe, a chain attached to the other end of the pipe gripping means, a groove conforming to the shape of the chain links provided in one side of the head, and means slidably mounted on the head for locking the chain in position in the groove.

CHRISTIAN ASHMUSEN.